US010626740B2

(12) United States Patent
Reynolds et al.

(10) Patent No.: US 10,626,740 B2
(45) Date of Patent: Apr. 21, 2020

(54) AIRFOIL TRAILING EDGE SEGMENT

(71) Applicant: General Electric Company, Schenectady, NY (US)

(72) Inventors: Brandon ALIanson Reynolds, Cincinnati, OH (US); Matthew Mark Weaver, Loveland, OH (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 15/372,859

(22) Filed: Dec. 8, 2016

(65) Prior Publication Data

US 2018/0163552 A1 Jun. 14, 2018

(51) Int. Cl.
| | |
|---|---|
| *F01D 9/04* | (2006.01) |
| *F01D 9/06* | (2006.01) |
| *F01D 9/02* | (2006.01) |
| *F01D 5/28* | (2006.01) |
| *F02K 3/04* | (2006.01) |

(52) U.S. Cl.
CPC .............. *F01D 9/065* (2013.01); *F01D 5/282* (2013.01); *F01D 5/284* (2013.01); *F01D 9/02* (2013.01); *F01D 9/042* (2013.01); *F02K 3/04* (2013.01); *F05D 2220/32* (2013.01); *F05D 2240/122* (2013.01); *F05D 2250/183* (2013.01); *F05D 2260/202* (2013.01); *F05D 2300/6033* (2013.01)

(58) Field of Classification Search
CPC .......... F01D 5/186; F01D 9/041; F01D 9/042; F01D 9/065; F01D 9/02; F01D 9/06; F01D 5/18; F01D 5/146; F05D 2240/122; F05D 2240/80; F05D 2220/32; F05D 2260/202; F05D 2300/6033; F05D 2260/20; F02K 3/04
USPC ....... 415/115; 416/223 R, 231 R, 241 B, 224
See application file for complete search history.

(56) References Cited

U.S. PATENT DOCUMENTS

| | | | |
|---|---|---|---|
| 2,585,871 A | * | 2/1952 | Stalker .................... F01D 5/186 415/115 |
| 3,540,810 A | | 11/1970 | Kercher |
| 3,846,041 A | | 11/1974 | Albani |
| 3,867,068 A | | 2/1975 | Corsmeier et al. |

(Continued)

FOREIGN PATENT DOCUMENTS

| | | |
|---|---|---|
| WO | WO2013013975 A1 | 1/2013 |
| WO | WO2015191041 A1 | 12/2015 |

*Primary Examiner* — Ninh H. Nguyen
(74) *Attorney, Agent, or Firm* — Dority & Manning, P.A.

(57) ABSTRACT

Turbine nozzle sections and airfoils having trailing edge segments are provided. In one embodiment, a turbine nozzle section comprises an inner band defining a pocket; an outer band defining an opening therethrough; and an airfoil radially extending from the inner band to the outer band and including pressure and suction sides. The airfoil has a body segment including a cavity and a plurality of ejector apertures defining a passageway from the cavity to an outer surface of the airfoil, and a trailing edge segment including an inner end and an outer end. The body segment defines a projection projecting inwardly from the suction side, and the trailing edge segment defines a notch opening toward the suction side. The projection is received within the notch. The inner end of the trailing edge segment is received within the inner band pocket, and the outer end is positioned within the outer band opening.

19 Claims, 8 Drawing Sheets

(56) References Cited

U.S. PATENT DOCUMENTS

| | | | |
|---|---|---|---|
| 4,989,406 A * | 2/1991 | Vdoviak | F01D 25/162 244/117 A |
| 5,090,866 A | 2/1992 | Blair | |
| 6,543,996 B2 * | 4/2003 | Koschier | F01D 5/186 415/200 |
| 6,983,608 B2 * | 1/2006 | Allen, Jr. | F01D 9/00 29/890.01 |
| 7,452,182 B2 | 11/2008 | Vance et al. | |
| 7,837,438 B2 * | 11/2010 | Campbell | F01D 5/146 415/191 |
| 8,197,211 B1 * | 6/2012 | Liang | F01D 5/282 416/224 |
| 8,657,561 B2 | 2/2014 | Buffone et al. | |
| 9,011,087 B2 | 4/2015 | Mironets et al. | |
| 2010/0104461 A1 * | 4/2010 | Smith | F04D 25/088 417/423.1 |
| 2010/0189556 A1 * | 7/2010 | Propheter-Hinckley | F01D 5/284 415/200 |
| 2013/0089431 A1 | 4/2013 | Stevenson et al. | |
| 2013/0272896 A1 | 10/2013 | Davis | |
| 2015/0044032 A1 * | 2/2015 | Paradis | F01D 25/246 415/134 |
| 2015/0044056 A1 * | 2/2015 | Hodgson | F01D 5/14 416/224 |
| 2015/0053365 A1 | 2/2015 | Mueller et al. | |
| 2016/0177757 A1 | 6/2016 | Sarawate et al. | |
| 2016/0230569 A1 | 8/2016 | Duelm et al. | |
| 2016/0245098 A1 | 8/2016 | Roberge | |

* cited by examiner

AIRFOIL TRAILING EDGE SEGMENT

FIELD

The present subject matter relates generally to airfoils of gas turbine engines. More particularly, the present subject matter relates to inserts for airfoil trailing edges.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, the turbine section includes one or more stator vane and rotor blade stages, and each stator vane and rotor blade stage comprises a plurality of airfoils, e.g., nozzle airfoils in the stator vane portion and blade airfoils in the rotor blade portion. Because the airfoils are downstream of the combustion section and positioned within the flow of combustion gases, the airfoils generally include one or more features for minimizing the effects of the relatively hot combustion gases, such as, e.g., cooling holes or slots that may provide cooling within and/or over the surface of the airfoils. However, such cooling features may have drawbacks; for instance, the cooling holes may clog with dust or other debris such that the cooling is reduced or effectively eliminated. In addition, even when cooling features are provided, some materials have a relatively limited temperature capability.

More commonly, non-traditional high temperature materials, such as ceramic matrix composite (CMC) materials, are being used in gas turbine applications. Components fabricated from such materials have a higher temperature capability compared with typical components, e.g., metal components, which may allow elimination of cooling features and/or increased engine temperatures. Accordingly, using high temperature materials for at least a portion of the airfoils in, e.g., the turbine section of a gas turbine engine may improve the durability of the airfoils, as well as improve time on wing and increase engine performance. For example, utilizing airfoils having a CMC segment may allow performance and durability improvements without greatly impacting manufacturing costs. Moreover, enlarging some or all of the remaining cooling holes may help prevent the holes from clogging with debris.

Therefore, airfoils and/or airfoil segments that overcome one or more disadvantages of existing designs would be desirable. In particular, a CMC trailing edge insert for an airfoil would be beneficial. Additionally, an airfoil comprising a CMC trailing edge segment and ejector apertures defined in a body segment would be useful.

BRIEF DESCRIPTION

Aspects and advantages of the invention will be set forth in part in the following description, or may be obvious from the description, or may be learned through practice of the invention.

In one exemplary embodiment of the present disclosure, a turbine nozzle section for a gas turbine engine is provided. The turbine nozzle section comprises an inner band defining a pocket; an outer band defining an opening therethrough; and an airfoil radially extending from the inner band to the outer band and including a pressure side and a suction side. The airfoil has a body segment including a cavity and a plurality of ejector apertures defining a passageway from the cavity to an outer surface of the airfoil. The body segment defines a projection projecting inwardly from the suction side. The airfoil also has a trailing edge segment including an inner end and an outer end. The trailing edge segment defines a notch opening toward the suction side. The notch is defined by a first mating face and a second mating face. The projection of the body segment is received within the notch of the trailing edge segment. The inner end of the trailing edge segment is received within the pocket of the inner band, and the outer end of the trailing edge segment is positioned within the opening of the outer band.

In another exemplary embodiment of the present disclosure, a turbine nozzle section for a gas turbine engine is provided. The turbine nozzle section comprises an inner band defining an inner band mating face; an outer band defining an outer band mating face; and an airfoil radially extending from the inner band to the outer band and including a pressure side and a suction side. The airfoil has a body segment defining a projection projecting inwardly from the suction side. The projection defined by a first body mating face and a second body mating face. The airfoil also has a trailing edge segment including an inner end defining a first mating face and an outer end defining a second mating face. The trailing edge segment defines a notch opening toward the suction side. The notch is defined by a third mating face and a fourth mating face. The projection of the body segment is received within the notch of the trailing edge segment. The first mating face of the trailing edge segment is positioned against the inner band mating face, the second mating face of the trailing edge segment is positioned against the outer band mating face, the third mating face of the trailing edge segment is positioned against the first body mating face, and the fourth mating face of the trailing edge segment is positioned against the second body mating face.

In a further exemplary embodiment of the present disclosure, an airfoil for a gas turbine engine is provided. The airfoil comprises a body segment defining a leading edge of the airfoil, a portion of a pressure side of the airfoil, and a portion of a suction side of the airfoil. The body segment includes a first joint portion. The airfoil further comprises a trailing edge segment defining a trailing edge of the airfoil, a remaining portion of the pressure side of the airfoil, and a remaining portion of the suction side of the airfoil. The trailing edge segment includes a second joint portion. The first joint portion interfaces with the second joint portion to form a joint between the body segment and the trailing edge segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
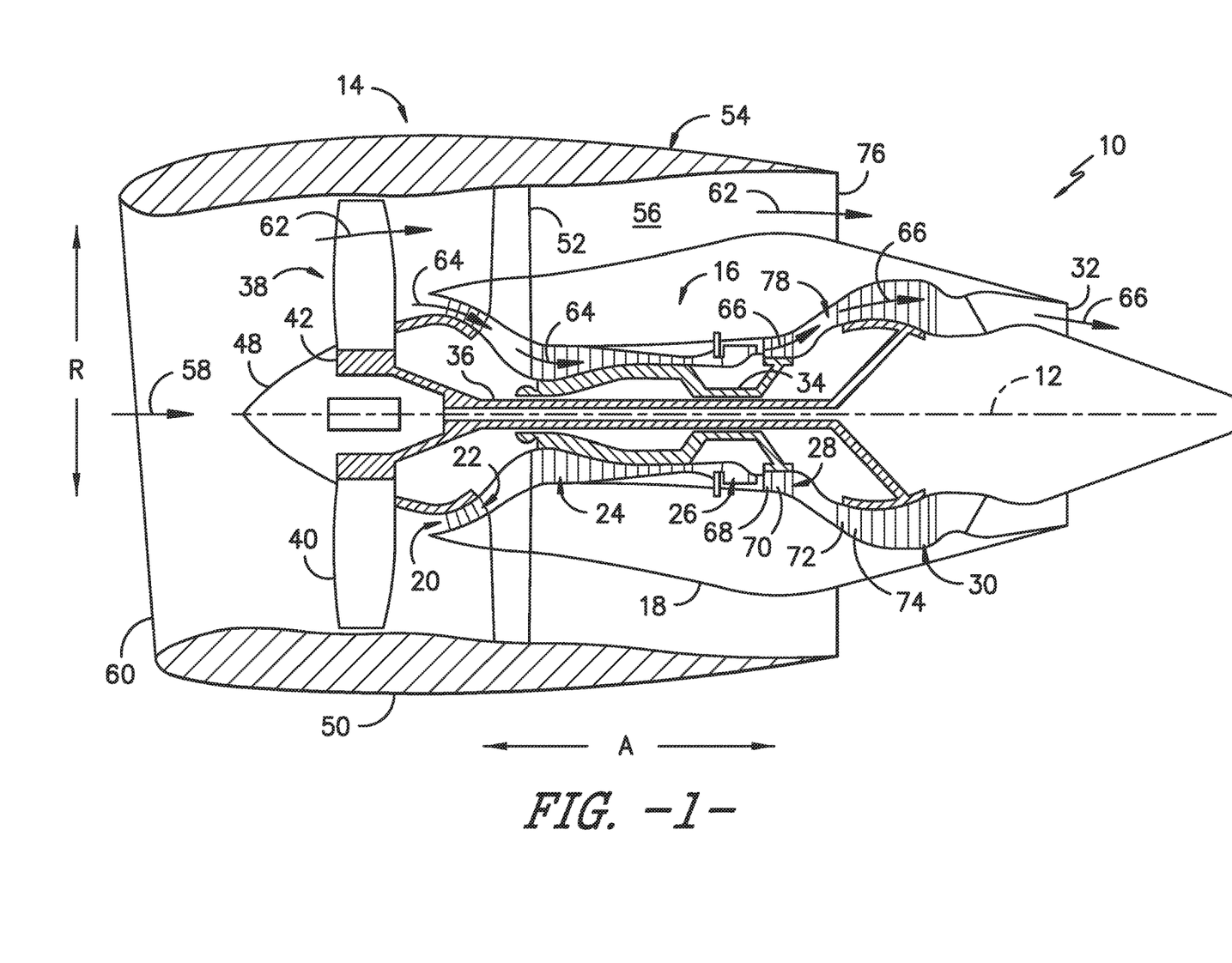
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. However, CMC components may be used in other sections as well, such as the compressor and/or fan sections. As a particular example described in greater detail below, a trailing edge for a turbine nozzle airfoil may be formed from a CMC material, e.g., to provide greater temperature capability at the trailing edge such that trailing edge cooling may be reduced or eliminated.

Figure 2:
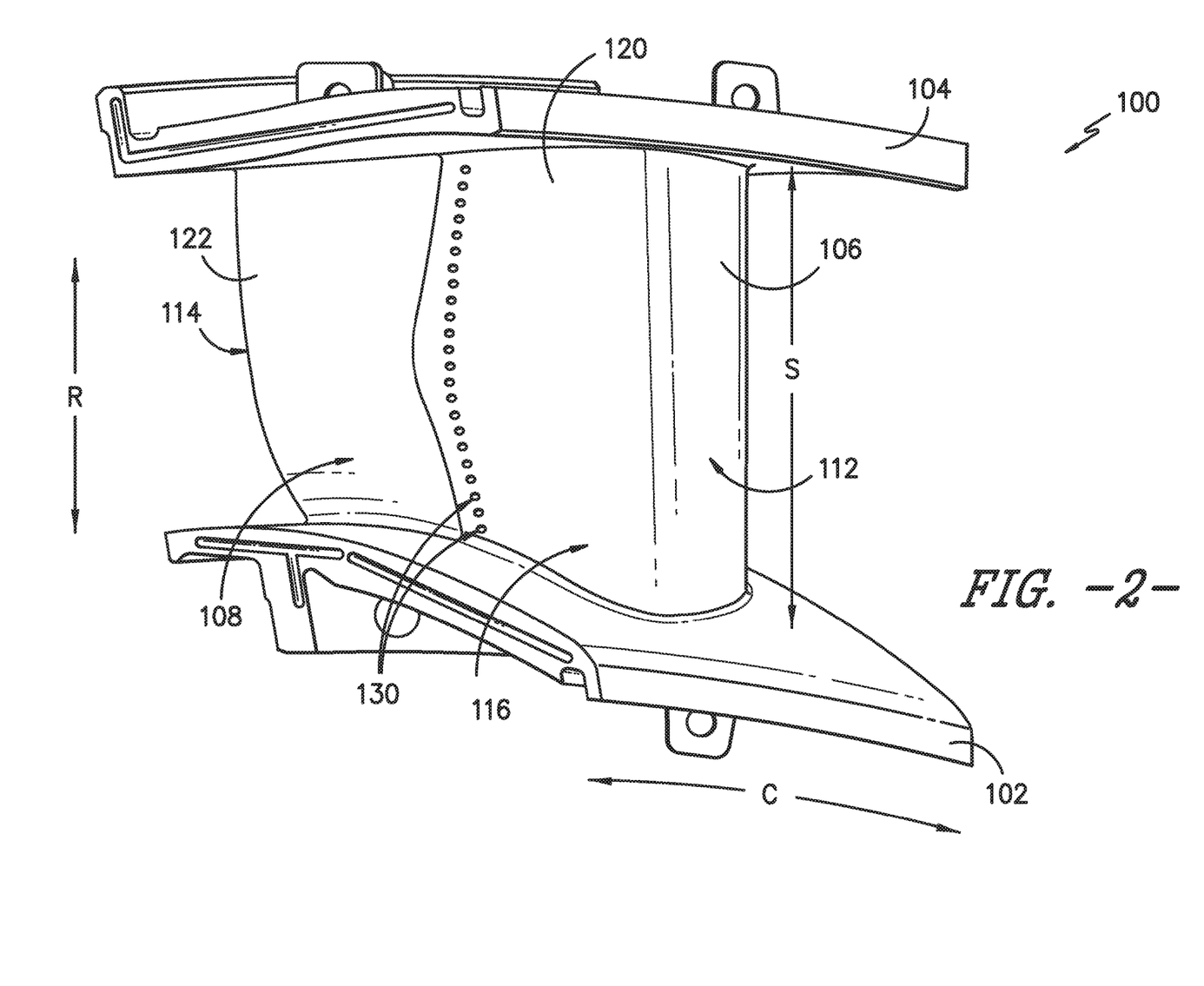
FIG. 2 provides a perspective view of a turbine nozzle section including an airfoil having a body segment and a trailing edge segment according to an exemplary embodiment of the present subject matter.
Figure 3:
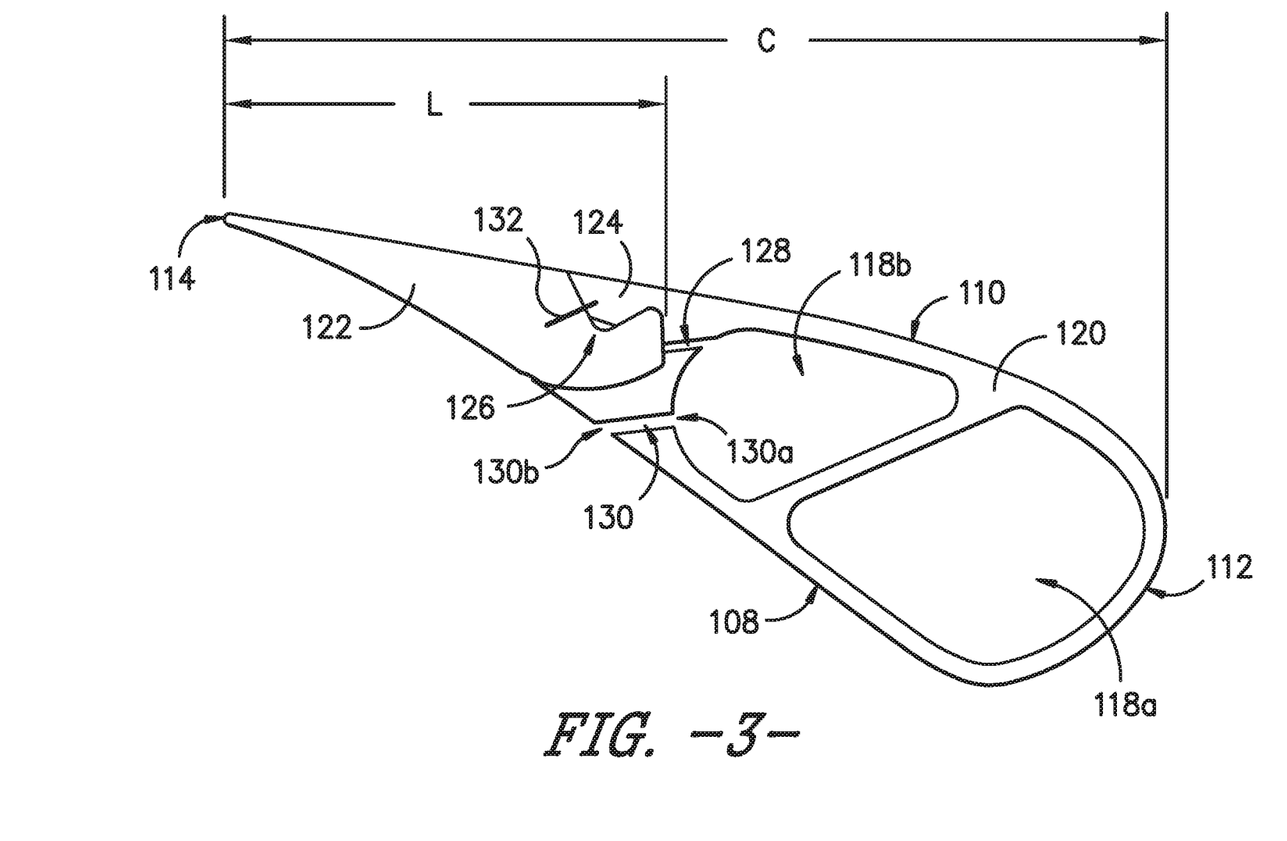
FIG. 3 provides a cross-section view of the airfoil of FIG. 2.

Turning to FIG. 2, a perspective view is provided of a turbine nozzle section according to an exemplary embodiment of the present subject matter. A turbine stator is formed by a plurality of turbine nozzle segments 100 that are abutted at circumferential ends, e.g., ends or sides spaced apart along a circumferential direction C, to form a complete ring about longitudinal centerline 12. Each nozzle segment 100 may comprise an inner band 102 and an outer band 104 with one or more airfoils 106 radially extending from inner band 102 to outer band 104. In some embodiments, airfoils 106 may be vanes 68 of HP turbine 28 or vanes 72 of LP turbine 30 described above. Each airfoil 106 has a concave pressure side 108 opposite a convex suction side 110 (FIG. 3). Opposite pressure and suction sides 108, 110 of each airfoil 106 radially extend along a span S from the inner band 102 to the outer band 104. Moreover, pressure and suction sides 108, 110 of airfoil 106 axially extend between a leading edge 112 and an opposite trailing edge 114. Leading edge 112 defines a forward end of airfoil 106, and trailing edge 114 defines an aft end of airfoil 106. Further, airfoil 106 defines a chord c (FIG. 3) extending axially between the opposite leading and trailing edges 112, 114. Pressure and suction sides 108, 110 of airfoil 106 define an outer surface 116 of the airfoil. Additionally, airfoil 106 may define one or move cavities 118 (FIG. 3) for receiving a flow of cooling fluid, e.g., a flow of pressurized air diverted from HP compressor 24. Each cavity 118, in turn, may provide cooling to one or more portions of airfoil 106.

As illustrated in FIG. 2, the airfoil 106 comprises a body segment 120 and a trailing edge segment 122. The body segment 120 includes the leading edge 112 of the airfoil 106, and the trailing edge segment 122 includes the trailing edge 114. The trailing edge segment 122 is formed separately from the body segment 120 but continues the aerodynamic shape of the airfoil 106 such that, together, the body segment 120 and trailing edge segment 122 form the airfoil 106. The body segment 120 and the trailing edge segment 122 may be made from different materials, as described in greater detail below. Moreover, the body segment 120 may be integral with inner band 102 and/or outer band 104 or may be separate from the inner and outer bands 102, 104. The trailing edge segment 122 may drop in to the turbine nozzle section 100, as further described herein.

FIG. 3 provides a cross-section view of the airfoil 106 according to an exemplary embodiment of the present subject matter. As shown in FIG. 3, the trailing edge segment 122 may have a length L that comprises a percentage of the chord c of the airfoil 106. For example, the length L of trailing edge segment 122 may be within a range of approximately 20% to approximately 60% of the chord c, or the length L generally may be less than half the chord c. In one embodiment, the length L may be about 40% of the chord c, but the length L may have other values as well.

As further depicted in FIG. 3, the body segment 120 of the exemplary airfoil 106 defines a projection 124, which fits within a notch 126 defined by the trailing edge segment 122. The projection 124 projects inwardly from the suction side 110 of the airfoil 106; that is, the projection 124 is defined within an interior of the airfoil 106. The notch 126 opens toward the suction side 110 and also is defined within the interior of the airfoil 106. When the projection 124 is received within the notch 126, the body segment 120 and the trailing edge segment 122 define a generally V shaped joint at which the segments 120, 122 interface.

Further, the body segment 120 defines two cavities 118 for receipt of a flow of cooling fluid, a first cavity 118a defined near the leading edge 112 of airfoil 106 and a second cavity 118b defined near a central portion of airfoil 106. The body segment 120 also defines a purge aperture 128 from the second cavity 118b toward the trailing edge segment 122 and an ejector aperture 130 from the second cavity 118b to the outer surface 116 at the pressure side 108 of airfoil 106. It will be appreciated that the body segment 120 may define a plurality of purge apertures 128 spaced apart from one another along the span S of airfoil 106, as well as a plurality of ejector apertures 130 spaced apart from one another along the radial span S of airfoil 106 as illustrated in FIG. 2. The ejector apertures 130 are described in greater detail below.

As shown in FIG. 3, the one or more purge apertures 128 have an outlet at the interface between the body segment 120 and trailing edge segment 122. As such, purge and/or cooling fluid from the one or more purge apertures 128 may flow between the body segment 120 and trailing edge segment 122. The flow of fluid from purge apertures 128 may flow to the pressure side 108 of airfoil 106 and lay down a cooling film on the pressure side 108. However, the flow of fluid from purge apertures 128 is discouraged from flowing to the suction side 110 of airfoil 106 by the shape of the interface between the body segment 120 and the trailing edge segment 122. More particularly, as shown in FIG. 3 and described above, the trailing edge segment 122 defines notch 126 that receives projection 124 of the body segment 120; the notch 126 is defined near the suction side 110 and between the outlet of the purge apertures 128 and the suction side 110. Thus, unlike the path from the purge apertures 128 to the pressure side 108 that generally is a smooth curve, to reach the suction side 110 of airfoil 106, the flow of fluid from purge apertures 128 must flow through a winding path, which discourages the flow of fluid toward the suction side 110. Further, a radial seal 132 is positioned between the outlet of the purge apertures 128 and the suction side 110 and, therefore, in the flow path of the fluid toward the suction side 110, which also helps prevent undesirable leakage to suction side 110, which may be chargeable if the joint or seam is downstream of the throat. The radial seal 132 may be a spline seal or other appropriate seal that extends generally radially along the span S within the airfoil 106 and from the body segment 120 to the trailing edge segment 122.

As illustrated in FIG. 3, each ejector aperture 130 has an inlet 130a at the second cavity 118b. Referring back to FIG. 2, each ejector aperture 130 also has an outlet 130b defined in the outer surface 116 at the pressure side 108 of the body segment 120. As such, the ejector apertures 130 define a passageway in which the cooling fluid in the second cavity 118b may flow from the second cavity 118b to the outer surface 116 of airfoil 106. That is, the cooling fluid flows into the ejector apertures 130 at inlets 130a, through the passageway defined by the ejector apertures 130, and out of the ejector apertures 130 at outlets 130b at the outer surface 116. As shown in FIG. 3, the outlets 130b are radially spaced apart from one another along the outer surface 116 of the pressure side 108 of the airfoil 106 to form a radial row of ejector aperture outlets 130b.

Cooling fluid ejected from the ejector apertures 130 lays down a fluid film to cool the trailing edge segment 122. For instance, the ejector aperture outlets 130b may be defined upstream of the trailing edge segment 122 such that the cooling fluid exiting the ejector apertures 130 forms a cooling film over the outer surface 116 of airfoil 106 defined by the trailing edge segment 122. In some embodiments, the ejector aperture outlets 130b may be defined generally immediately upstream of the trailing edge segment 122, as illustrated in FIG. 3.

Further, the ejector apertures 130 may be sized to eject dust particles and other debris, e.g., that is not filtered out by a cooling baffle (not shown) in the second cavity 118b. For example, the ejector apertures 130 may have a larger diameter than a diameter of apertures in the cooling baffle such that particles and debris that are not captured by the cooling baffle do not clog the ejector apertures 130. Moreover, the body segment 120 may define more ejector apertures 130 than purge apertures 128, and the ejector apertures 130 may have a larger diameter than a diameter of the purge apertures 128 such that a greater amount of fluid flow passes through the ejector apertures 130 than the purge apertures 128. As one example, the body segment 120 may include twice, or more than twice, the number of ejector apertures 130 than purge apertures 128, such as twenty (20) or more ejector apertures 130 compared to ten (10) purge apertures 128. As a further example, the ejector apertures 130 may have a diameter within the range of about 0.028 inches to about 0.032 inches, e.g., approximately 0.030 inches, while the purge apertures 128 may have a diameter of within the range of about 0.018 inches to about 0.022 inches, e.g., approximately 0.020 inches. However, other numbers and sizes of purge apertures 128 and ejector apertures 130 may be used as well. Moreover, although only one radial row of ejector apertures 130 is illustrated in FIG. 3, in other embodiments, more than one row or one or more partial radial rows of ejector apertures 130 may be used. Additionally or alternatively, other apertures, such as other cooling film apertures, may be defined along the outer surface 116 of airfoil 106 to provide cooling flow from a cavity 118 to the outer surface 116, e.g., to cool other portions of the outer surface 116 and/or to provide additional cooling flow to the outer surface 116.

Figure 4:
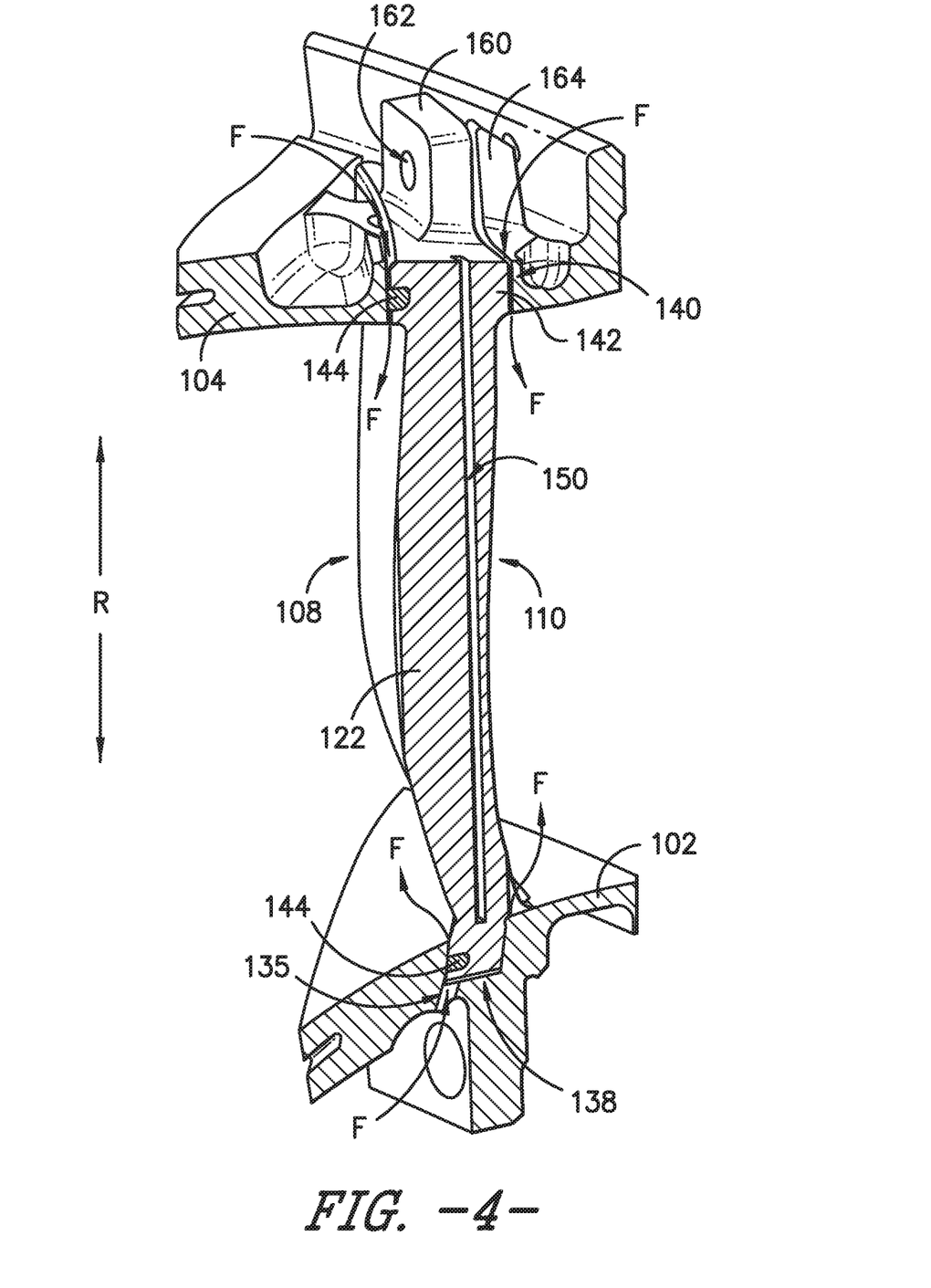
FIG. 4 provides a cross-section view of the turbine nozzle section of FIG. 2.
Figure 5A:
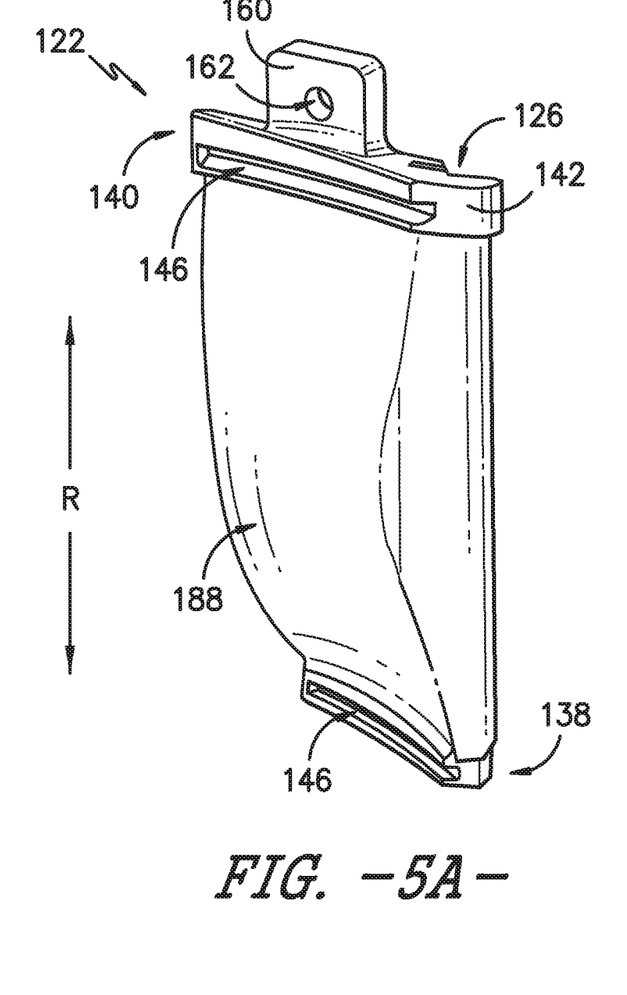
FIG. 5A provides a pressure side perspective view of the trailing edge segment of the airfoil of FIG. 2.
Figure 5B:
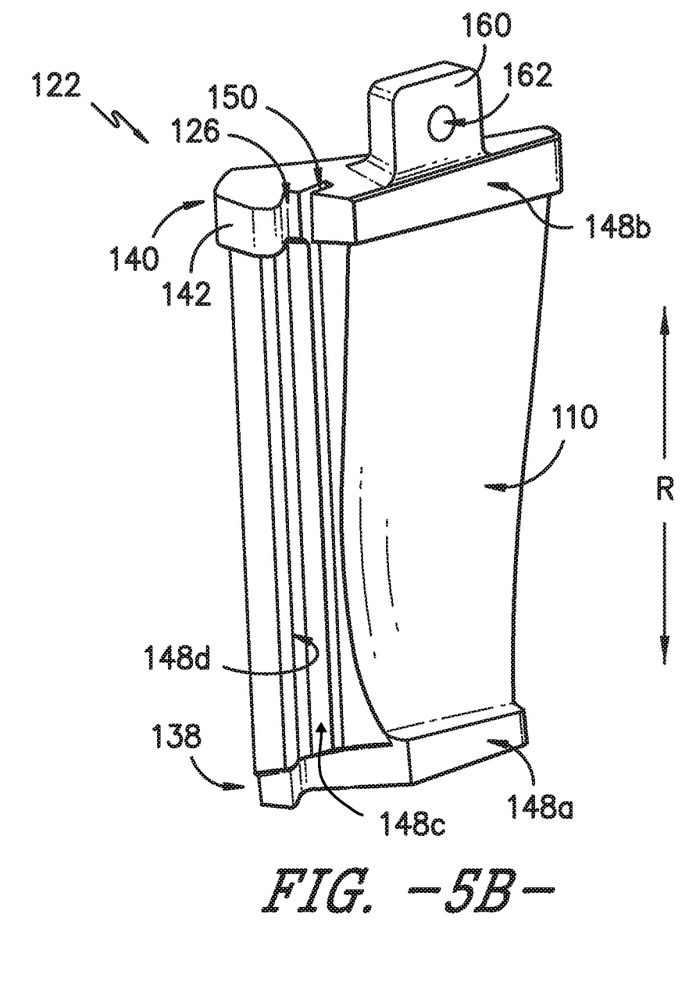
FIG. 5B provides a suction side perspective view of the trailing edge segment of the airfoil of FIG. 2.
Figure 6:
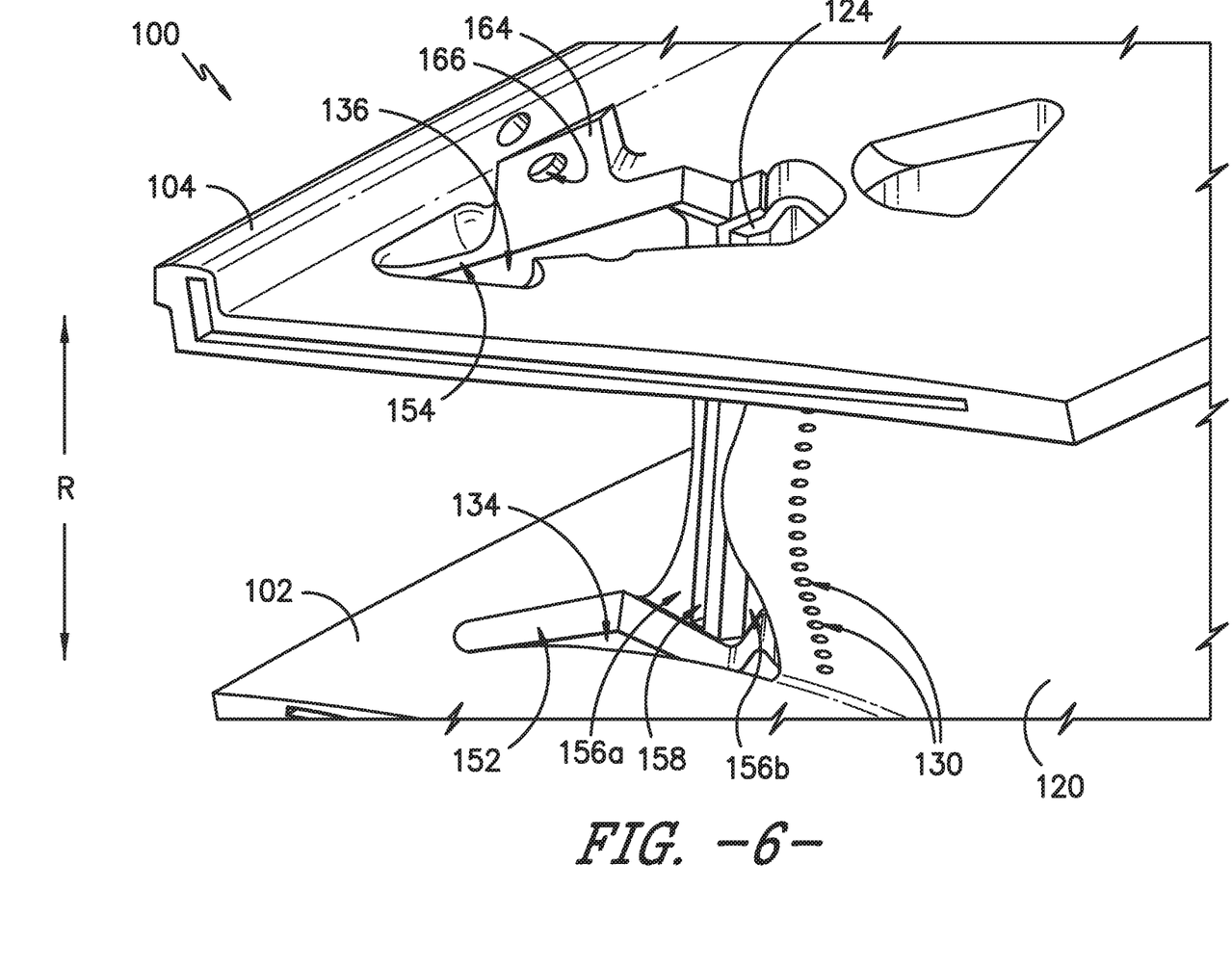
FIG. 6 provides a perspective view of the turbine nozzle section of FIG. 2 without the trailing edge segment of the airfoil.

Turning now to FIGS. 4, 5A, 5B, and 6, the trailing edge segment 122 and the turbine nozzle section 100 will be described in greater detail. FIG. 4 provides a cross-section view of the turbine nozzle section 100 of FIG. 2, where the cross-section is taken through the trailing edge segment 122 and the inner and outer bands 102, 104. FIG. 5A provides a pressure side perspective view of the trailing edge segment 122, and FIG. 5B provides a suction side perspective view of the trailing edge segment 122. FIG. 6 provides a perspective view of the turbine nozzle section 100 with the trailing edge segment 122 of airfoil 106 removed.

As shown in FIG. 4, the trailing edge segment 122 is received within the inner band 102 and the outer band 104 of the turbine nozzle section 100. More particularly, in the illustrated embodiment, the trailing edge segment 122 is received within a pocket 134 (FIG. 6) defined in the inner band 102 and an opening 136 (FIG. 6) defined in the outer band 104. As such, the trailing edge segment 122 may be positioned in the turbine nozzle section 100 by inserting an inner end 138 of the trailing edge segment 122 through the opening 136 in the outer band 104 and into the pocket 134 of the inner band 102 such that the inner end 138 is received within the pocket 134 and an outer end 140 of the trailing edge segment 122 is positioned within the opening 136. Thus, the opening 136 may be sized such that the inner end 138 and the majority of the trailing edge segment 122 can pass through the opening 136. Further, the outer end 140 of the trailing edge segment 122 may be flared or define a boss 142 to fill the opening 136.

Moreover, one or more seals 144, such as a rope seal, wire seal, or other appropriate seal, may be positioned along the inner end 138 of trailing edge segment 122 within the pocket 134 and along the outer end 140 of trailing edge segment 122 within the opening 136. Turning to FIG. 5A, a groove 146 is defined along the pressure side 108 of each of the inner and outer ends 138, 140 for receipt of a seal 144. The seals 144 help prevent fluid leakage at the pocket 134 and opening 136, but any fluid that does leak to the pressure side helps form an air curtain that discourages pressure side to suction side crossover leakage. For example, as shown in FIG. 4, fluid flow from outside of the inner band 102 and/or outer band 104 may flow around the trailing edge segment 122 and out of the pocket 134 and/or the opening 136, as shown by the arrows F. The flow of fluid out of the pocket 134 and/or the opening 136 discourages fluid from flowing into the pocket 134 and/or the opening 136 on the pressure side 108 and out of the pocket 134 and/or the opening 136 on the suction side 110. In one embodiment, a purge flow F may be introduced into pocket 134 via one or more purge holes 135 in the inner band 102 as shown in FIG. 4, but the purge flow F may be provided to pocket 134 in other ways as well.

As illustrated in FIG. 5B, the trailing edge segment 122 defines several mating faces 148, which mate with mating faces defined by the inner band 102, outer band 104, and body segment 120. The trailing edge segment mating faces 148 are generally flat or planar for mating with generally flat or planar mating faces of other portions of the turbine nozzle section 100 as described in greater detail below. Further, as depicted in FIG. 5B, the mating faces 148 are defined along or near the suction side 110. More particularly, a first mating face 148a is defined along the suction side of the inner end 138 of trailing edge segment 122, and a second mating face 148b is defined along the suction side of the outer end 140 of trailing edge segment 122. A third mating face 148c defines one side of the notch 126 of the trailing edge segment 122; in the exemplary embodiment of FIG. 5B, the third mating face 148c is angled inward from the suction side 110. A fourth mating face 148d defines the other side of the notch 126 of the trailing edge segment 122; as such, the third and fourth mating faces 148c, 148d generally form a V shape. Moreover, a groove 150 is defined in the trailing edge segment 122 for receipt of the radial seal 132; as shown in FIG. 5B, the groove 150 is defined through the third mating face 148c.

Referring now to FIG. 6, the inner band 102 defines an inner band mating face 152 that mates with the first mating face 148a of the trailing edge segment 122. The outer band 104 defines an outer band mating face 154 that mates with the second mating face 148b of the trailing edge segment. The body segment 120 defines a first body mating face 156a that mates with the third mating face 148c of the trailing edge segment 122 and a second body mating face 156b that mates with the fourth mating face 148d of the trailing edge segment 122. The first body mating face 156a defines a groove 158 for receipt of the radial seal 132, such that the radial seal 132 extends between the trailing edge segment 122 and body segment 120 within the respective grooves 150, 158.

As previously stated, each of the mating faces 152, 154, 156a, 156b are generally flat or planar such that they mate with the generally flat or planar mating faces 148 of the trailing edge segment 122. More specifically, as the combustion gases 66 flow against and by the airfoil 106, an aerodynamic load is placed on the airfoil 106, including the trailing edge segment 122. The aerodynamic load loads the trailing edge segment 122 into the suction side of the pocket 134 and opening 136, as well as the body segment projection 124, such that the mating faces 148 of the trailing edge segment 122 press against the mating faces 152, 154, 156a, 156b of the inner band 102, outer band 104, and body segment 120. The aerodynamic loading of the trailing edge segment 122 into the mating faces 152, 154, 156a, 156b positions the trailing edge segment 122 axially and tangentially, i.e., along the axial direction A and circumferential direction C, as well as removes an overturning moment that results from the aerodynamic load. Such positioning may, e.g., help maintain a throat area between adjacent airfoils 106 of the turbine nozzle stage. Further, loading the trailing edge segment 122 into the inner and outer bands 102, 104, as well as the body segment 120, may help seal the pocket 134 and opening 136 and the interface between the body segment 120 and the trailing edge segment 122 against undesirable leakage.

Figure 7:
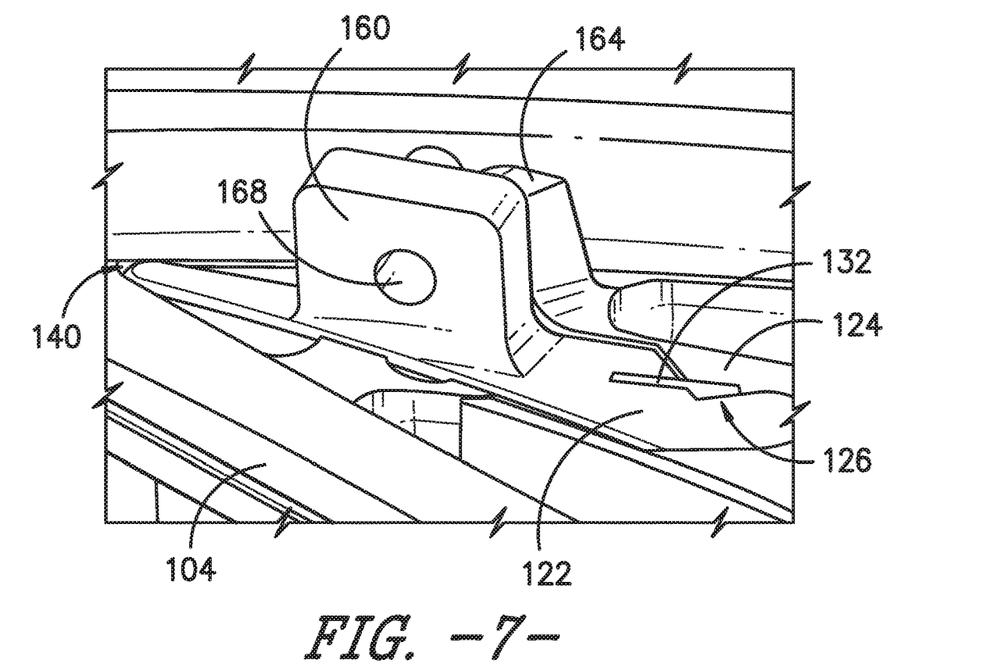
FIG. 7 provides a perspective view of a radially outer portion of the turbine nozzle section of FIG. 2.
Figure 8:
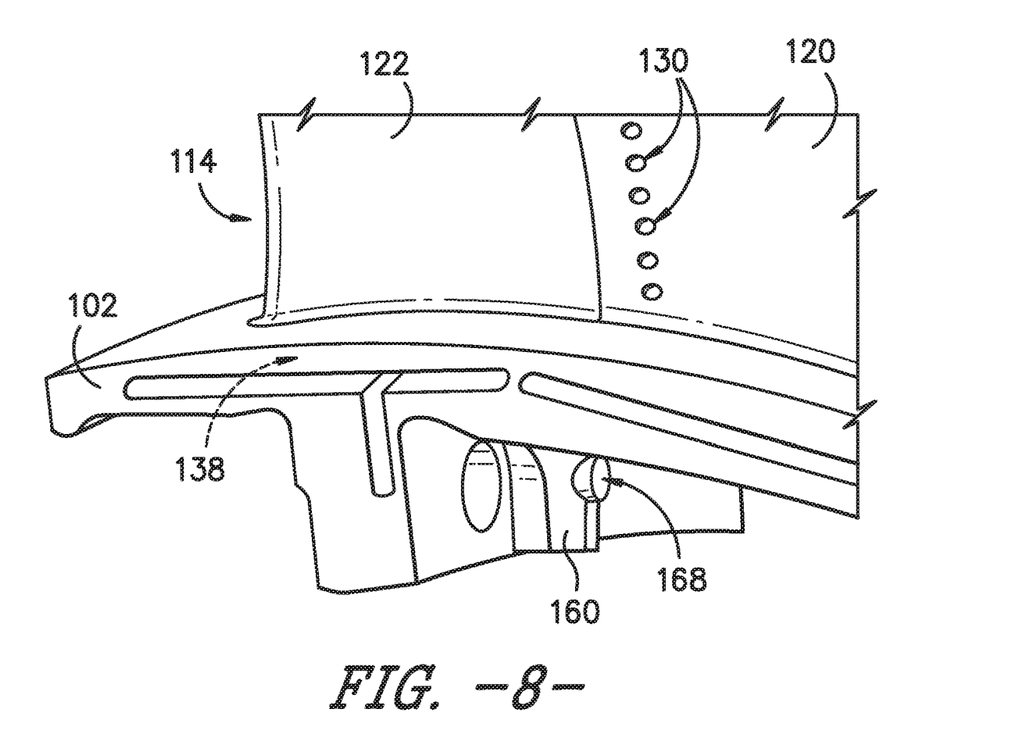
FIG. 8 provides a perspective view of a radially inner portion of the turbine nozzle section of FIG. 2 according to another exemplary embodiment of the present subject matter.

The trailing edge segment 122 includes a pin flange 160 projecting radially outwardly from the outer end 140, as shown in FIGS. 4, 5A, and 5B. The trailing edge segment pin flange 160 defines a pin aperture 162 therethrough. Similarly, the outer band 104 includes a pin flange 164 projecting radially outwardly, as shown in FIGS. 4 and 6, and the outer band pin flange 164 defines a pin aperture 166 therethrough. Referring to FIG. 7, a pin 168 may be positioned within the pin apertures 162, 166 to pin the trailing edge segment 122 to the outer band 104 and thereby radially position and retain the trailing edge segment 122. That is, the pin 168 is positioned within the trailing edge segment pin aperture 162 and the outer band pin aperture 166 to pin the trailing edge segment 122 to the outer band. In other embodiments, the trailing edge segment 122 may be pinned at the inner band 102 as an alternative to being pinned at the outer band 104. For example, as shown in FIG. 8, a pin flange 160 may project radially inward from the inner end 138 of the trailing edge segment, and the pin flange 160 at the inner end 138 may define a pin aperture 162. The inner band 102 may define a pin aperture 166, and a pin 168 may be positioned through both the pin apertures 162, 166 to pin the trailing edge segment 122 at its inner end 138 and thereby radially position and retain the trailing edge segment 122. Thus, the trailing edge segment 122 may be radially pinned at the inner band 102, the outer band 104.

Figure 9:
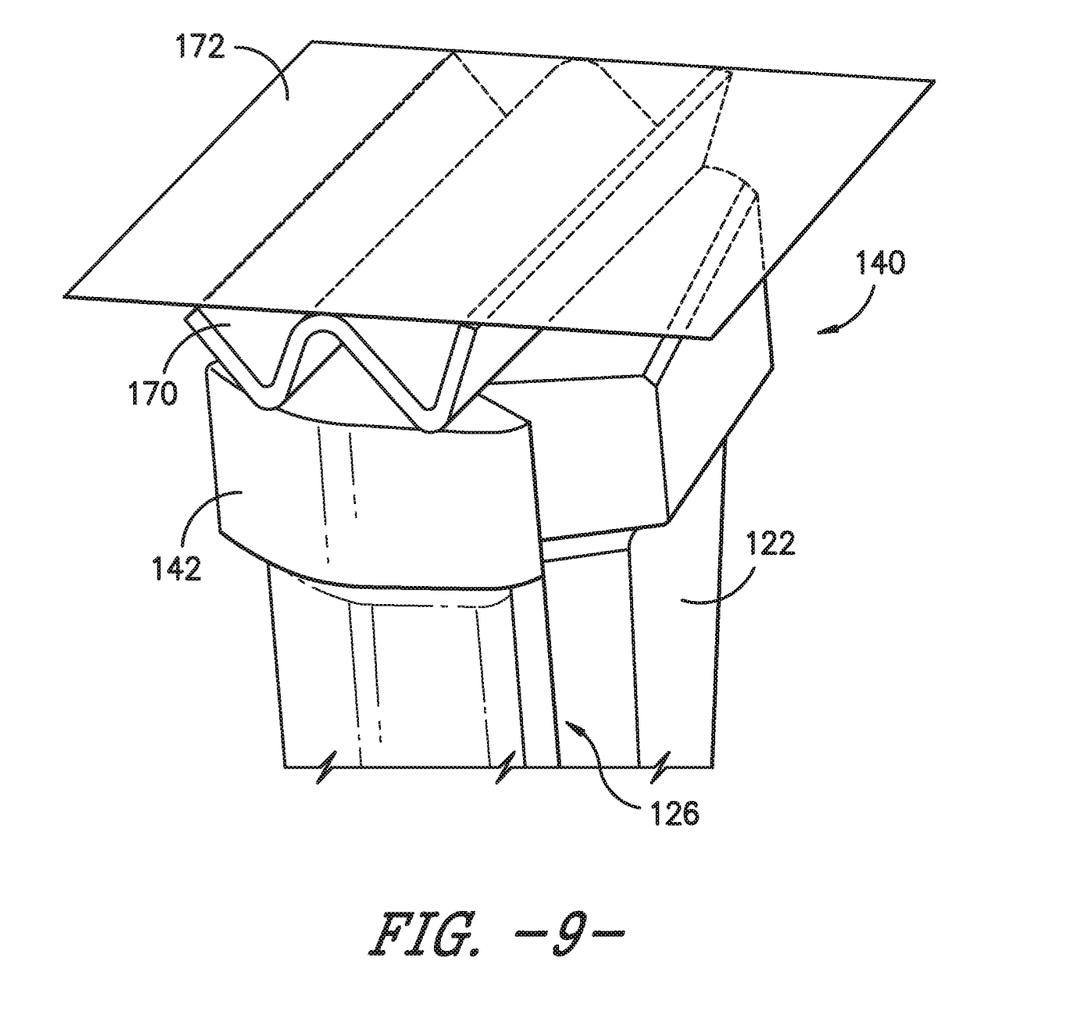
FIG. 9 provides a perspective view of a radially outer portion of the trailing edge segment of the airfoil of FIG. 2 according to another exemplary embodiment of the present subject matter.

In still other embodiments, the trailing edge segment 122 may be radially positioned by means other than radially pinning the trailing edge segment 122 as shown, e.g., in FIGS. 7 and 8. For instance, referring to FIG. 9, a spring and cap may be positioned at a radial end of the trailing edge segment 122 to radially position and retain the trailing edge segment. More specifically, FIG. 9 illustrates a W shaped spring 170 positioned on the radially outer surface of the outer end 140 of the trailing edge segment 122. Other springs 170, such as a coil spring or the like, may be used as well. A cap 172 is positioned radially outward of the spring 170 to hold the spring 170 in position and thereby radially position and retain the trailing edge segment 122. Further, similar to the pinned embodiments described above, the spring 170 and cap 172 may be used at either of the inner and outer ends 138, 140 of the trailing edge segment 122 and may be used in place of or in combination with pinning the inner end 138 and/or outer end 140.

In some embodiments, the pocket 134 may be defined in the outer band 104 rather than the inner band 102 and the opening 136 may be defined in the inner band 102 rather than the outer band 104. In such embodiments, the opening 136 may be sized such that the outer end 140 of the trailing edge segment 122 may be inserted through the opening 136 in the inner band 102 and received in the pocket 134 defined in the outer band 104. Accordingly, the inner end 138 may be flared or define boss 142 to fill the opening 136 in inner band 102. The trailing edge segment 120 may be otherwise configured similar to the embodiment described above with respect to FIGS. 4 through 9.

In yet other embodiments, other joints or interfaces between the body segment 120 and the trailing edge segment 122 than the V shaped notch 126 and projection 124 may be used. For example, a lap joint, a dovetail joint, a tongue and groove joint, or other notch and projection shapes may be used. Further, although shown and described herein with the trailing edge segment 122 defining the notch 126 and the body segment 120 defining the projection 124, it should be understood that either segment could define the notch 126 and the other segment define the projection 124. Similarly, if another joint type was used, either segment could define one portion of the joint and the other segment define the other portion of the joint, e.g., the body segment 120 could define the tongue and the trailing edge segment 122 define the groove of a tongue and groove joint or vice versa.

Moreover, in some embodiments, the trailing edge segment 122 may be cooled similar to the body segment 120. That is, the trailing edge segment 122 may define one or move cavities 118 for receipt of a cooling fluid. Such internal cooling of the trailing edge segment 122 may be provided, e.g., where the trailing edge segment 122 comprises a substantial portion of the airfoil 106. As one example, the trailing edge segment 122 may define one or more cavities 118 in embodiments where the length L of the trailing edge segment 122 is greater than the length L of the embodiment illustrated herein. As another example, the trailing edge segment 122 may define one or more cavities 118 in embodiments where the length L of the trailing edge segment 122 is greater than about half the chord c. Other configurations of the trailing edge segment 122, or certain applications of trailing edge segment 122, e.g., the use of trailing edge segment 122 in certain engine configurations, also may be suitable for inclusion of one or more cavities 118 within the trailing edge segment 122.

As previously stated, the body segment 120 and the trailing edge segment 122 preferably are made from different materials. For instance, the body segment 120 may be formed from a metallic material, such as a metal alloy or the like, and the trailing edge segment 122 may be formed from a composite material, such as a ceramic matrix composite (CMC) or the like. By forming the trailing edge segment 122 from a high temperature material such as a CMC, internal cooling of the trailing edge segment, such as provided by cavities 118 defined in the body segment 120, can be reduced or eliminated. As shown in the figures, the exemplary trailing edge segment 122 described herein does not include any internal cooling features. As such, the cooling flow to the airfoil 106 may be reduced, which may improve engine performance. Other performance benefits, durability benefits, and the like also may be achieved by using a CMC trailing edge segment 122, or a trailing edge segment 122 formed from another such high temperature material.

In an exemplary embodiment, the trailing edge segment 122 is formed from a CMC material, and a method for forming the CMC trailing edge segment 122 first may comprise laying up a plurality of plies of the CMC material to form a CMC preform having a desired shape or contour. It will be appreciated that the plurality of CMC plies forming the preform may be laid up on a layup tool, mold, mandrel, or another appropriate device for supporting the plies and/or for defining the desired shape. The desired shape of CMC preform may be a desired shape or contour of the resultant CMC trailing edge segment 122. As an example, the plies may be laid up to define the notch 126, the boss 142, and the pin flange 160. Laying up the plurality of plies to form the CMC trailing edge segment preform may include defining other features of the trailing edge segment 122 as well, such as the continuation of the shape of airfoil 106 from the body segment 120, including the trailing edge 114 of the airfoil 106.

After the plurality of plies is laid up to form the preform, the preform may be processed, e.g., compacted and cured in an autoclave. After processing, the preform forms a green state CMC component, i.e., a green state CMC trailing edge segment 122. The green state CMC component is a single piece component, i.e., curing the plurality of plies of the preform joins the plies to produce a CMC component formed from a continuous piece of CMC material. The green state component then may undergo firing (or burn-off) and densification to produce a densified CMC trailing edge segment 122. For example, the green state component may be placed in a furnace with silicon to burn off any mandrel-forming materials and/or solvents used in forming the CMC plies, to decompose binders in the solvents, and to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

Optionally, after firing and densification the CMC trailing edge segment 122 may be finish machined, if and as needed, and/or coated with an environmental barrier coating (EBC). For instance, the seal grooves 146, 150 may be machined into the CMC trailing edge segment 122, and/or the mating faces 148 may be machined to help the trailing edge segment 122 interface with the mating faces 152, 154, 156a, 156b of the inner band 102, outer band 104, and body segment 120. In some embodiments, the interface surfaces or other features may be machined into the green state trailing edge segment 122, i.e., after the CMC preform is processed but before undergoing firing and densification, the green state component may be "green machined" to define one or more features of the resultant trailing edge segment 122. Green machining may be preferable for defining some features of the trailing edge segment 122 because the green state CMC component is more malleable and flexible than the fired and densified CMC component and, thus, may be easier to machine.

The foregoing method of forming a CMC trailing edge segment 122 is provided by way of example only. For example, other known methods or techniques for compacting and/or curing CMC plies, as well as for densifying the green state CMC component, may be utilized. Alternatively, any combinations of these or other known processes may be used.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A turbine nozzle section for a gas turbine engine, comprising:

an inner band defining a pocket;

an outer band defining an opening therethrough and including a pin flange projecting radially outwardly; and an airfoil radially extending from the inner band to the outer band, the airfoil including a pressure side and a suction side, the airfoil having a body segment including a cavity and a plurality of ejector apertures defining a passageway from the cavity to an outer surface of the airfoil, the body segment defining a projection projecting inwardly from the suction side, and a trailing edge segment including an inner end, an outer end, and a pin flange projecting radially outwardly from the outer end, the trailing edge segment defining a notch opening toward the suction side, the notch defined by a first mating face and a second mating face, wherein the body segment is integral with each of the inner band and the outer band, wherein the projection of the body segment is received within the notch of the trailing edge segment, wherein the inner end of the trailing edge segment is received within the pocket of the inner band and the outer end of the trailing edge segment is positioned within the opening of the outer band, wherein the trailing edge segment pin flange defines a pin aperture therethrough and the outer band pin flange defines a pin aperture therethrough, and wherein a pin is positioned within the trailing edge segment pin aperture and the outer band pin aperture, the pin extending perpendicular to a radial direction along which the trailing edge segment extends.

2. The turbine nozzle section of claim 1, wherein the inner end of the trailing edge segment defines a groove along the pressure side and the outer end of the trailing edge segment defines a groove along the pressure side, and wherein a seal is positioned within the groove defined in the inner end and a seal is positioned within the groove defined in the outer end.

3. The turbine nozzle section of claim 1, wherein a radially extending groove is defined in the first mating face of the trailing edge segment and a radially extending groove is defined in a first body mating face of the body segment, and wherein a radial seal is positioned with the grooves defined in the first mating face and the first body mating face such that the radial seal extends from the trailing edge segment to the body segment and extends radially within the airfoil.

4. The turbine nozzle section of claim 1, wherein the airfoil defines a chord extending axially between a leading edge and an opposite trailing edge, wherein the trailing edge segment has a length, and wherein the length of the trailing edge segment is within a range of 40% to 60% of the chord.

5. The turbine nozzle section of claim 1, wherein each of the ejector apertures includes an outlet defined in the outer surface on the pressure side of the airfoil, and wherein the plurality of ejector apertures are spaced apart from one another along a radial span of the airfoil.

6. The turbine nozzle section of claim 1, wherein the body segment is formed from a metallic material and the trailing edge segment is formed from a ceramic matrix composite material.

7. A turbine nozzle section for a gas turbine engine, comprising:
an inner band defining an inner band mating face;
an outer band defining an outer band mating face; and
an airfoil radially extending from the inner band to the outer band, the airfoil including a pressure side and a suction side, the airfoil having
a body segment defining a projection projecting inwardly from the suction side, the projection defined by a first body mating face and a second body mating face, and
a trailing edge segment including an inner end defining a first mating face and an outer end defining a second mating face, the trailing edge segment defining a notch opening toward the suction side, the notch defined by a third mating face and a fourth mating face,
wherein the projection of the body segment is received within the notch of the trailing edge segment, wherein each of the first mating face, second mating face, third mating face, and fourth mating face of the trailing edge segment are planar and each of the inner band mating face, outer band mating face, first body mating face, and second body mating face are planar, wherein the third mating face is angled inward from the suction side such that the third and fourth mating faces form a V shape, and wherein the first mating face of the trailing edge segment is positioned against the inner band mating face, the second mating face of the trailing edge segment is positioned against the outer band mating face, the third mating face of the trailing edge segment is positioned against the first body mating face, and the fourth mating face of the trailing edge segment is positioned against the second body mating face.

8. The turbine nozzle section of claim 7, wherein the inner band defines a pocket and the outer band defines an opening therethrough, and wherein the inner end of the trailing edge segment is received within the pocket and the outer end of the trailing edge segment is positioned within the opening.

9. The turbine nozzle section of claim 8, wherein the outer end of the trailing edge segment includes a boss, the boss filling the opening in the outer band.

10. The turbine nozzle section of claim 7, wherein the projection of the body segment and the notch of the trailing edge segment define an interface between the body segment and the trailing edge segment, and wherein the body segment further includes a cavity and a plurality of purge apertures defined from the cavity to the interface.

11. The turbine nozzle section of claim 10, wherein a seal radially extends within the interface, the seal extending from the third mating face of the trailing edge segment to the first body mating face of the body segment.

12. The turbine nozzle section of claim 7, wherein the body segment and the trailing edge segment are formed from different materials.

13. The turbine nozzle section of claim 12, wherein the trailing edge segment is formed from a ceramic matrix composite material.

14. An airfoil for a gas turbine engine, comprising:
a body segment defining a leading edge of the airfoil, a portion of a pressure side of the airfoil, and a portion of a suction side of the airfoil, the body segment including a first joint portion, the first joint portion having at least one planar mating face; and
a trailing edge segment defining a trailing edge of the airfoil, a remaining portion of the pressure side of the airfoil, and a remaining portion of the suction side of the airfoil, the trailing edge segment including a second joint portion, the second joint portion having at least one planar mating face,
wherein the at least one planar mating face of the first joint portion mates with the at least one planar mating face of the second joint portion such that the first joint portion interfaces with the second joint portion to form a joint between the body segment and the trailing edge segment,
wherein the joint defines only a portion of the interface between the body segment and the trailing edge segment, a remaining portion of the interface comprising a smooth curve, and
wherein the joint is defined from the smooth curve to the suction side and the smooth curve is defined from the joint to the pressure side, the joint defining a winding path from the smooth curve to the suction side.

15. The airfoil of claim 14, wherein the first joint portion is a projection having a first body mating face and a second body mating face, wherein the second joint portion is a notch formed by a first mating face and a second mating face, and wherein the notch receives the projection to form the joint.

16. The airfoil of claim 15, wherein the body segment further includes a cavity for receipt of a flow of fluid and a plurality of purge apertures, and wherein the purge apertures direct the flow of fluid to the interface.

17. The airfoil of claim 16, wherein the body segment further defines a plurality of ejector apertures from the cavity to an outer surface of a pressure side of the airfoil.

18. The airfoil of claim 17, wherein each of the plurality of ejector apertures includes an outlet defined in the outer surface upstream of the trailing edge segment, the outlets of the plurality of ejector apertures spaced radially apart from one another along the outer surface.

19. The airfoil of claim 15, further including a seal radially extending within the interface between the body segment and the trailing edge segment, the seal extending from one mating face of the notch to one body mating face of the projection, the seal disposed between the smooth curve and the suction side.

\* \* \* \* \*